A. ARATO.
STEERING GEAR FOR VEHICLES USED AS TRAILERS.
APPLICATION FILED MAR. 12, 1919.

1,378,436. Patented May 17, 1921.

Inventor:
Achille Arato
By ⟨signature⟩
Attorney

UNITED STATES PATENT OFFICE.

ACHILLE ARATO, OF TURIN, ITALY, ASSIGNOR TO FERRUCCIO BOTTA, OF TURIN, ITALY.

STEERING-GEAR FOR VEHICLES USED AS TRAILERS.

1,378,436.  Specification of Letters Patent.  Patented May 17, 1921.

Application filed March 12, 1919. Serial No. 282,208.

*To all whom it may concern:*

Be it known that I, ACHILLE ARATO, manufacturer, a subject of the King of Italy, and a resident of Turin, Corso San Maurizio 45, Italy, have invented certain new and useful Improvements in Steering-Gears for Vehicles Used as Trailers, of which the following is a clear, true, and exact specification.

This invention relates to four wheeled trailer vehicles of the kind having wheels mounted on pivoted axles or carriages and provided with steering means for causing the wheels to follow the track of the wheels of the tractor or of a preceding vehicle during hauling.

The object of this invention is to provide an improved arrangement for transmitting the deviations of the coupling between the two vehicles to the trailer wheels, said arrangement being less complicated and cumbersome than the arrangements at present in use.

Figure 1:
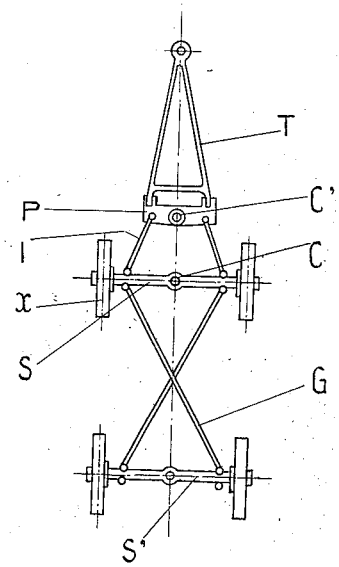
Figure 2:
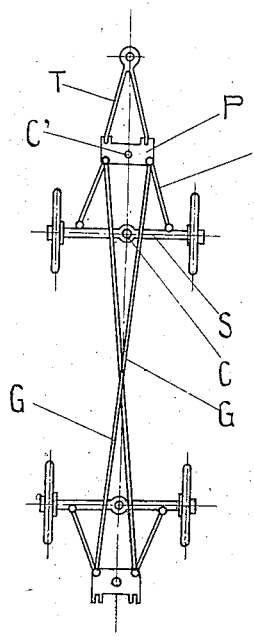

In the annexed drawings Figure 1 shows in plan view the diagram of an embodiment of this invention and Fig. 2 shows in plan view the diagram of a modified construction.

With reference to Fig. 1, the four wheels —x— of the carriage are mounted in pairs on the ends of axles S and S' each adapted to rotate around its vertical central axis with regard to the frame, this latter being not shown for sake of clearness. The opposite ends of the two axles S and S' are connected together by cross ties G which are connected with the axles S and S' at points spaced to equal distances from the pivots C.

At the center of the end piece of the vehicle frame and apart from the pivot point of the adjacent axle, is pivoted at C', a movable member P to which the coupling T is hinged to rock around a horizontal axis, so that the side movements of the coupling are directly transmitted to the member P while said coupling T is free for moving in vertical direction.

The member P is connected with adjacent pivoted axle S by rods I, and the points of connection of said rods I with the member P and pivoted axle S respectively are spaced apart to different extents from the respective centers of rotation of said parts, the ratio between the distance from pivot pin C' to pivot point of bar I on the member P and distance from pivot point C of the axle S to pivot point of bar I on the same axle S being the same ratio as required between the deviations of member P and axle S for the purpose of causing the wheels of the trailer to follow the track of wheels of the tractor or preceding carriage. This ratio depends upon the particular construction of the cars that is upon the distance between the axles and the distance between the head-stocks of the subsequent vehicles.

By the described construction the deviations imparted to the member P by the coupling T are transmitted under the required ratio and in the same direction to the pivoted axle S and the deviations of said axle are transmitted to the same extent and in opposite directions to the rear axle S'.

The construction according to Fig. 2 comprises two members P each pivoted around a vertical axis C' on one of heads of the carriage frame, said members being connected together by means of cross ties G. Each member P is connected by means of bars I with the adjacent pivoted axle S, the ratio between the distances of pivot points of bars I on member P and axle S from the respective centers of rotation C' and C being that above stated.

In this case the deviation imparted to one of members P by the coupling T is transmitted to the same extent and in opposite direction to the opposite member P and the deviation of each member P is transmitted in the same direction and under required ratio to the adjacent pivoted axle.

What I claim as my invention and desire to secure by U. S. Letters Patent is:—

1. In a trailer comprising front and rear pivoted parts each carrying a pair of wheels, the combination of a member pivoted to swing at one end of the trailer around a vertical axis; a coupling member; hinged on said swinging member to rotate around a horizontal axis; ties each connected with the swinging member and the adjacent wheel carrying part at points located at the same side of and at different distances from the respective centers of rotation; and cross ties inter-connecting the parts intended to be rotated in opposite directions for steering both the front and rear wheels in the tracks of the rear wheels of the pulling element.

2. In a trailer having wheels mounted on front and rear steering parts, a member pivoted to swing at one end of said trailer around a vertical axis distinct from the axis of rotation of said steering parts; means for connecting said member with a pulling element; and means interconnecting said front and rear steering parts and the swinging end member, said means comprising ties pivoted to said swinging end member and transmitting the deviations of said swinging member connected with the pulling element to the front steering part in the same direction and under reduced ratio and other ties transmitting the deviations of said swinging end member to the rear steering parts in the opposite direction and under the same reduced ratio, said ratio being such as to cause the front and rear wheels of the trailer to follow in the tracks of the rear wheels of the pulling element.

3. In a trailer comprising pivoted parts each carrying a pair of wheels, the combination of a member pivoted to swing at the head of the trailer around a vertical axis, means for connecting said member with a pulling element, ties each connected with said swinging member and the adjacent wheel carrying part at points located at the same side of and at different distances from the respective centers of rotation to cause the front wheels of the trailer to substantially follow in the tracks of the rear wheels of the pulling element, and cross ties interconnecting the front and rear wheel carrying parts to transmit the deviations of the front wheel carrying parts to the rear wheel carrying parts in reverse direction and under the same reduced ratio to cause the rear wheels to substantially follow in the tracks of the front wheels.

In witness whereof I have hereunto signed my name in the presence of two subscribing witnesses.

ACHILLE ARATO.

Witnesses:
 ANDREA LINNO,
 RICHARD B. HAVEN.